United States Patent [19]

Reilly

[11] Patent Number: 4,585,808

[45] Date of Patent: Apr. 29, 1986

[54] MONOMER REMOVAL FROM A POLYMER

[75] Inventor: Patrick J. Reilly, Akron, Ohio

[73] Assignee: The Goodyear Tire & Rubber Company, Akron, Ohio

[21] Appl. No.: 345,854

[22] Filed: Feb. 4, 1982

[51] Int. Cl.$^4$ .............................. C08F 6/10; C08F 2/54
[52] U.S. Cl. .................................... 522/116; 522/120; 522/124; 522/125; 522/903; 522/912
[58] Field of Search .................................... 204/159.17

[56] References Cited

U.S. PATENT DOCUMENTS

| | | | |
|---|---|---|---|
| 3,895,171 | 6/1975 | Deamud et al. | 204/159.17 |
| 4,086,411 | 4/1978 | Nagano et al. | 204/159.17 |
| 4,174,043 | 11/1979 | Salame et al. | 264/22 |
| 4,212,649 | 7/1980 | Sakurada et al. | 204/159.17 |

FOREIGN PATENT DOCUMENTS

| | | |
|---|---|---|
| 48-41267 | 5/1973 | Japan . |
| 53-16772 | 2/1978 | Japan . |
| 53-35390 | 5/1978 | Japan . |

*Primary Examiner*—Allan M. Lieberman
*Attorney, Agent, or Firm*—Alvin T. Rockhill; J. D. Wolfe

[57] ABSTRACT

A method of reducing the monomer content of a polymer or polymerization media comprising subjecting the polymer containing the monomer to sufficient irradiation with a high energy radiation to polymerize said monomer, said radiation preferably occurring in presence of chemical agent that accelerate the rate of consumption of the undesirable monomer, i.e. the monomer considered hazardous and/or protects the polymer from radiation degradation.

6 Claims, No Drawings

MONOMER REMOVAL FROM A POLYMER

TECHNICAL FIELD

This invention relates to a method of removing monomer from a polymer or its media by high energy radiation. More particularly, this invention relates to reduction of the vinyl chloride level in polyvinyl chloride.

BACKGROUND ART

Monomers such as vinyl chloride monomer can be removed by heat and vacuum in most cases but this has several disadvantages: time, cost, energy input, possible thermal degradation of the polymer, difficulty in getting down to very low concentrations of the residual monomers such as vinyl chloride monomer, and extreme difficulty is experienced in getting vinyl chloride monomer out of "glassy" polyvinyl chloride. This is true regardless of how the polymer is produced, viz bulk, emulsion or solution polymerization.

DISCLOSURE OF THE INVENTION

This invention reduces the monomer level, preferably residual monomer in polymers or the polymerization media, by irradiating with high energy radiation (e.g. gamma rays or accelerated electrons). This invention applies to other monomer/polymer pairs where the monomer is radiation sensitive to polymerization and/or graft polymerization to yield polymers and polymerization media having monomer levels that pass the current governmental standards, such as the Environmental Protection Agency's vinyl chloride on acrylonitrile monomer standards.

By this invention, for instance, a polyvinyl chloride polymer or its polymerization media having a vinyl chloride monomer from a high to a relatively low level can be irradiated with a high energy radiation to lower the monomer level to acceptable levels or levels dictated by governmental regulations. Also this invention contemplates the use of one or more chemical agents to aid in protecting the polymer from irradiation degradation and to aid in reducing the harmful or toxic level of a specific monomer to an acceptable level. The polymers and polymerization media which contain monomer levels higher than desired can have the monomer levels lowered by subjecting the polymer or its media to sufficient irradiation: usually 0.5 to 13 megarads total dosages of high energy radiation such as gamma rays from a cobalt 60 source or electron beams is sufficient to lower the monomer to acceptable levels.

The polymers and their media to which this invention is applicable are the polymers or copolymers of monoolefins and diolefins containing primarily carbon and hydrogen atoms, and in some cases additional elements such as oxygen, nitrogen and chlorine. These polymers and copolymers can be made by any of the well known methods using bulk, aqueous or solution polymerization techniques. Thus the method of polymerization normally determines the media the polymer is situated therein. For instance, polymerization performed in an aqueous media leaves the polymer present as a latex. Even where latex is readily broken to yield the polymer the unpolymerized monomer is partitioned between the polymer layer and the water layer. Thus the monomer concentration in both layers has to be treated to reduce the monomer level to the acceptable range.

Representative chemical agents can be added to the polymerization media in about 0.1 to 2 percent and preferably 0.5 to 1 percent by weight to aid in the reduction of the undesirable monomer. Particularly preferred are those chemical agents that accelerate the rate of consumption of the undesired monomer and protects the polymer from radiation degradation. Representative examples are the olefins or the diolefins such as the acrylates of esters of acrylic and methacrylic acid, and hydrocarbon olefins of 2 to 20 carbon atoms such as amgline, styrene and divinyl and diolefins of 4 to 20 carbon atoms such as isoprene or butadiene.

One of the advantages of this invention is that irradiation of the latex or media with high energy radiation reduces the monomer level in the water layer upon treatment of the latex to recover the polymer and thus eliminates treatment of the water layer to remove the monomer.

The nature and other advantages of this invention can be more readily seen and appreciated by reference to the following representative examples where all parts and percentages are by weight unless otherwise indicated.

EXAMPLE 1

One hundred grams of polyvinyl chloride resin containing vinyl chloride monomer was irradiated with gamma rays from a cobalt 60 source. After three hours of irradiation and a total dosage of 0.1 megarad the "dried" polyvinyl chloride weighed 100.2 grams, indicating that 0.2 gram of vinyl chloride monomer had polymerized or graft polymerized within the polyvinyl chloride to effect a substantial reduction of the vinyl chloride monomer level.

Similar experiments done with polyvinyl chloride containing both butadiene monomer and vinyl chloride monomer gave enhanced vinyl chloride monomer reduction. It was noted that butadiene inhibited radiation degradation of the polyvinyl chloride, too. Employment of the above phenomena lends to reduction of vinyl chloride monomer in polyvinyl chloride as well as in other polymers.

EXAMPLE 2

Irradiation of polyvinyl chloride containing vinyl chloride monomer in the presence of additional monomer(s) serves to (a) accelerate the rate of consumption of vinyl chloride monomer and to (b) protect the polyvinyl chloride from radiation degradation. For these reasons the additional monomers should preferably be radiation sensitive and copolymerize with vinyl chloride monomer.

Polyvinyl chloride containing 12,000 parts per million vinyl chloride monomer and 0.5 percent by weight of methyl methacrylate was irradiated with a cobalt 60 source. After 0.5 megarad exposure the concentration of vinyl chloride monomer fell to 5000 parts per million. At a dosage of 3 megarads the concentration has fallen to 30 parts per million.

EXAMPLE 3

An unstripped butadiene acrylonitrile latex containing 7,500 parts per million (0.75 percent) of the acrylonitrile monomer was irradiated at room temperature with gamma rays from a cobalt 60 source. Exposure to 4 megarads of said radiation reduced acrylonitrile level to 1000 parts per million (0.1 percent). The evidence pointed to the fact essentially all the acrylonitrile in the water level was polymerized and the residual acrylonitrile was dispersed in the polymer. Hence the polymer could be recovered by coagulation to yield a water having acceptable acrylonitrile levels.

EXAMPLE 4

Another unstripped acrylonitrile/butadiene latex containing 5163 parts per million of acrylonitrile was irradiated at room temperature with electron beams ($4.5 \times 10^4$ megarads/hour) until the total dosage of the treatment was 3.1 megarads. The acrylonitrile level was reduced to 2875 parts per million.

EXAMPLE 5

An SBR carpet lamination latex containing approximately 42.3 percent styrene, 56.5 percent butadiene and the rest itaconic acid and a monomer level of about 40,000 parts per million was irradiated with cobalt 60 gamma rays at 1.0 megarad/hour at room temperature. The drop in monomer level is shown in the following table for total dosage given.

TABLE I

| Dosage, Megarads | Monomer Level, PPM |
|---|---|
| 0.5 | 29,000 |
| 1.0 | 21,000 |
| 2.0 | 4,000 |
| 4.0 | 73 |
| 8.0 | 6 |

A latex containing a copolymer of 24 percent styrene, 76 percent butadiene and 20.5 percent solids was irradiated with cobalt 60 gamma rays at room temperature and 1.0 megarad/hour rate. The monomer level at total dosage given is shown in Table II.

TABLE II

| Dosage, Megarads | Monomer Level, PPM |
|---|---|
| 0 | 2,100 |
| 2.0 | 1,312 |
| 4.0 | 641 |
| 6.0 | 275 |
| 9.5 | 64 |
| 10.0 | 1 |

While certain representative embodiments and details have been shown for the purpose of illustrating the invention it will be apparent to those skilled in this art that various changes and modifications may be made therein without departing from the spirit or scope of the invention.

I claim:

1. A method of reducing the monomer content of a polymer or polymerization media comprising adding to the media a chemical agent selected from the class consisting of acrylates, hydrocarbon olefins and diolefins to form a mixture and then subjecting the mixture of the polymer containing the monomer to sufficient irradiation with a high energy radiation to polymerize said monomer.

2. The method of claim 1 wherein the monomer is at least one of the class consisting of vinyl chloride, butadiene, acrylonitrile and styrene.

3. The method of claim 1 wherein the dosage of high energy radiation is from 0.5 to 13 megarads.

4. The method of claim 1 wherein the high energy radiation is electrons or alpha particles.

5. The method of claim 1 wherein the chemical agent is present in about 0.1 to 2 percent by weight.

6. The method of claim 1 wherein the high energy radiation is gamma rays or accelerated electrons.

* * * * *